(12) United States Patent
Robins et al.

(10) Patent No.: US 6,173,445 B1
(45) Date of Patent: Jan. 9, 2001

(54) DYNAMIC SPLASH SCREEN

(76) Inventors: Nicholas Robins, 8 Fernhill Ave., Ross, CA (US) 94957; Thomas Chipperfield, 211 Hill Blvd., Petaluma, CA (US) 94952

(*) Notice: Under 35 U.S.C. 154(b), the term of this patent shall be extended for 0 days.

(21) Appl. No.: 09/023,031

(22) Filed: Feb. 13, 1998

(51) Int. Cl.⁷ .................................................. G06N 9/445
(52) U.S. Cl. ............................................................ 717/11
(58) Field of Search ................................ 395/712, 200.5; 345/418

(56) References Cited

U.S. PATENT DOCUMENTS

| | | | |
|---|---|---|---|
| 4,754,326 | * 6/1988 | Kram et al. | 707/1 |
| 5,566,069 | * 10/1996 | Clark, Jr. et al. | 702/2 |
| 5,596,702 | * 1/1997 | Stucka et al. | 395/340 |
| 5,600,766 | * 2/1997 | Deckys et al. | 395/135 |
| 5,724,530 | * 3/1998 | Stein et al. | 345/329 |
| 5,742,829 | * 4/1998 | Davis et al. | 700/12 |
| 5,758,072 | * 5/1998 | Filepp et al. | 395/200.5 |
| 5,760,770 | * 6/1998 | Bliss et al. | 345/335 |
| 5,781,773 | * 7/1998 | Vanderpool et al. | 707/100 |
| 5,796,967 | * 8/1998 | Filepp et al. | 345/339 |
| 5,862,325 | * 1/1999 | Reed et al. | 395/200.31 |
| 5,889,951 | * 3/1999 | Lombardi | 709/219 |
| 5,920,696 | * 7/1999 | Brandt et al. | 395/200.48 |

OTHER PUBLICATIONS

W3C, *The Open Software Description Format (OSD)*, www.w3.org/TR/NOTE–OSD.html, Jul. 20, 1999, pp. 1–13.
W3C, *Channel Definition Format (CDF)*, Mar. 9, 1997, www/w3.org/TR/NOTE–CDFsubmit.html, pp. 1–11.

Title: Geo Emblaze, Creator 2.5 for Mac & Windows., Author: Manners, Chris, Source: Interactivity, Feb., 1998.*

Title: Newsbytes Daily Summary, Source: Newsbytes, Aug. 18th, 1997.*

Title: Messaging's Next Blockbuster Hit, Source: Network Computing, Apr. 15th, 1997.*

Title: Using the Web Instead of a Window System, Author: Rice et al, ACM, 1996.*

Title: Productivity Tools for Web–Based Information, author: Robin Green, ACM, 1998.*

* cited by examiner

*Primary Examiner*—Tariq R. Hafiz
*Assistant Examiner*—Chameli Chaudhuri Das

(57) ABSTRACT

A method of displaying information to a user upon startup of a program on a first computer. The method includes obtaining the information from a second computer and, upon startup of the program on the first computer, displaying the information. A method is described, where the program is a program that runs on a first computer. A second computer sends, over the network to first computer, information to be displayed to a user. A command is received to launch the program. After receiving the command to launch the program and without user intervention, at least a portion of the information is displayed. Without user intervention, the at least a portion of the information is removed. A method, wherein the information is obtained over a network is described, as well as wherein the network comprises the internet. An embodiment wherein the information is described in a flash screen is described.

76 Claims, 5 Drawing Sheets

DYNAMIC SPLASH SCREEN

BACKGROUND OF THE INVENTION

1. Field of the Invention

The invention relates to user interfaces, and more particularly to techniques of improving the flexibility of splash screens.

2. Related Art

Computer application programs have often included a splash screen upon startup. Also known as a banner, the splash screen typically identifies the application program and provides other information to the user as the application loads from a the hard drive to computer memory. The splash screen may identify the name of the application including the version number and may contain other information such as a copyright notice. A splash screen may inform the user that the application is loading from memory and that the correct application is loading. The splash screen also may provide advertising for the product because it presents the name of the product to the user and may include attractive logos or graphics. Typically, the splash screen is presented to the user without user intervention, for example, for 15 seconds, and is removed without user intervention.

Many prior splash screens provide the same image each time the application program starts. Also, many prior splash screens are determined before the application is obtained by the user. Thus, a splash screen often involved old information with possibly outdated logos.

SUMMARY OF THE INVENTION

The invention includes a method of displaying information to a user upon startup of a program on a first computer. The method includes obtaining the information from a second computer and, upon startup of the program on the first computer, displaying the information.

According to an embodiment of the invention, the program is an application program that runs on a first computer. A second computer sends, over the network to first computer, information to be displayed to a user. A command is received to launch the application program. After receiving the command to launch the application program and without user intervention, at least a portion of the information is displayed. Without user intervention, the at least a portion of the information is removed.

An embodiment of the invention includes receiving a command to launch a second application. Then, after receiving the command to launch the second application program and without user intervention, the at least a portion of the information is displayed. Without user intervention, the at least a portion of the information is removed.

According to an aspect of the invention, the displaying comprises displaying a name of a newer version of the application program.

Another embodiment of the invention includes receiving additional information at the first computer from the second computer. A second command is received to launch the application program. After receiving the second command to launch the application, at least a portion of the additional information is displayed without user intervention.

According to another aspect of the invention, the displaying at least a portion of the information occurs during loading of the computer application program from a storage device into computer memory. Alternatively, the displaying at least a portion of the information occurs, according to another aspect of the invention, only until fifteen seconds of beginning of loading of the computer application program from a storage device into computer memory.

An aspect of the invention includes the application storing at least a portion of the information on a storage device in at least a first data structure, the first data structure corresponding to a screen. In one embodiment, the first data structure is stored in a resource shared by applications. In another embodiment, the resource comprises the Windows registry.

According to an aspect of the invention, the data structure includes an identification of a second application, wherein the method includes displaying the screen if the second application is not installed on the storage device and a name of the second application appears in the screen corresponding to the data structure.

An embodiment of the invention can be characterized as a method of displaying information to a user upon startup of an application program that runs on a first computer, where the method includes sending over a network from the first computer to a second computer an identifier of the application program. Based on the identifier of the application program, the second computer sends the information over the network to first computer. A command to launch the application program is received. After receiving the command to launch the application program, at least a portion of the information is displayed.

According to another aspect of the invention, a command to launch a second application program is received and, after receiving the command to launch the second application program, at least a portion of the information is displayed.

An embodiment of the invention includes a method of providing information from a first computer to a second computer, where the information is to be displayed to a user upon startup of an application program. At the first computer, an identification of an application program installed on the second computer is received over a network from the second computer. At the first computer, a data structure corresponding to the application program is selected based on the identification of the application program. The data structure includes information to be displayed by the application program on the second computer. The data structure is sent over the network to the second computer.

The data structure includes, according to an aspect of the invention, an identification of a newer version of the application program. The data structure may also comprise a graphical image, which may identify a newer version of the application program.

According to an embodiment of the invention, at the first computer, an identification of a second application program installed on the second computer is received over the network from the second computer. At the first computer, a second data structure corresponding to the second application program is selected. The second data structure is sent over the network to the second computer.

According to an embodiment of the invention, at the first computer, an identification of the application program is received over the network from a third computer. At the first computer, a data structure is selected based on the identification of the application program. The data structure is sent over the network to the third computer.

The data structure includes, in various combinations according to various aspects of the invention:

a number corresponding to a start date after which to display a screen corresponding to the data structure.

a number corresponding to a start time after which to display a screen corresponding to the data structure.

a number corresponding to a stop date before which to display a screen corresponding to the data structure.

a number corresponding to a stop time before which to display a screen corresponding to the data structure.

a number corresponding to a duration for which to display a screen corresponding to the data structure.

a digital signature.

an identification of a second application program that obviates the need for the screen corresponding to the data structure.

An embodiment of the invention includes at the first computer, receiving over the network from the second computer an identification of a second data structure present on the second computer; at the first computer, selecting a third data structure that does not comprise the second data structure, the third data structure including information to be displayed by an application program on the second computer; and sending the third data structure over the network to the second computer.

An embodiment of the invention can be characterized as a method of displaying information to a user in a computer application program including obtaining over the Internet information to be displayed to the user and displaying at least a portion of the information in a splash screen.

According to an aspect of the invention a communications module that obtains the information runs at least at some time when an application program in which the information is to be displayed is not running.

According to another aspect of the invention, the obtaining over the Internet information to be displayed to the user occurs over an Internet connection initiated for other than obtaining the information.

An embodiment of the invention can be characterized as a method of displaying information to a user in a local computer application program including obtaining the information over the Internet. After obtaining the information, a command to launch the application program is received. After receiving the command, a portion of the information to be displayed to the user is loaded from a local storage device. The portion of the information is displayed in a splash screen. After displaying the portion of the information in a splash screen, at least a portion of the computer application program is loaded from the storage device into computer memory. After loading from the storage device into computer memory the portion of the computer application program, the splash screen is removed.

DETAILED DESCRIPTION

Figure 1:
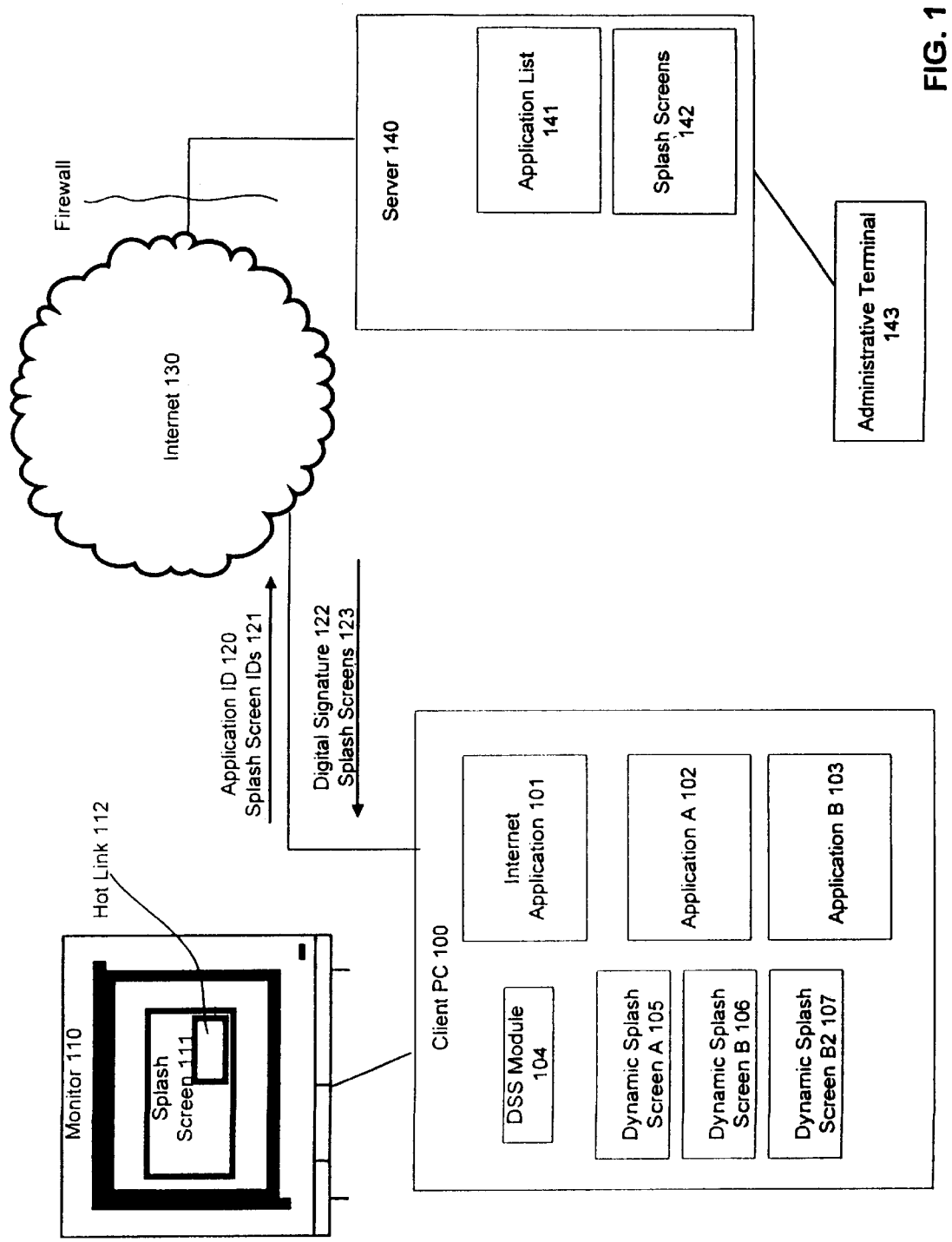
FIG. 1 is a simplified diagram illustrating an example network environment with an application.

A detailed description of examples of the present invention is provided with reference to the figures, in which FIG. 1 illustrates a context in which the present invention is used.

The present invention provides methods for displaying and obtaining different splash screens. A splash screen is one of the initial screens displayed upon loading of an application program or shortly after start of an application program. In an example of the invention, the computer on which the application program runs obtains a splash screen or screens over the Internet from a server computer. When the application program is started, one of the splash screens is displayed. The splash screens obtained over the Internet may contain updated information about the application program or information about other products of interest. When screens are obtained over the Internet, the computer may identify application programs installed on it to the remote computer from which the computer obtains the splash screens so as to obtain splash screens that correspond to the application programs installed. The computer may also identify splash screens already stored locally at the computer associated with the application programs installed so that the remote server may avoid sending screens that have already been sent. To help avoid disruption to the user, an aspect of the invention is to wait for and use an Internet connection that was initiated by another program, other than the program that obtains the splash screens.

FIG. 1 is a simplified diagram illustrating an example network environment with an application according to an embodiment of the invention. FIG. 1 includes client PC 100, which displays splash screens, server 140, from which the splash screens are obtained, and Internet 130, over which the splash screens are transmitted from server 140 to client PC 100. Client PC 100 includes Internet application 101, application A 102, application B 103, dynamic splash screen module 104. Client PC 100 also includes dynamic splash screen A 105, dynamic splash screen B1 106, and dynamic splash screen B2 107. Client PC 100 is coupled to monitor 110, which displays dynamic splash screen 111 and hot link 112. Client PC 100 is coupled through Internet 130 to server 140. Server 140 includes application list 141 and splash screens 142. Server 140 is coupled to administrative terminal 143. Client PC has a number of applications which may run on it at various times.

A user typically installs applications 101, 102, and 103. The applications may also be installed over a network such as Internet 130. DSS module 104 is show as a separate program from the applications 101–103. However, DSS module 104 may be included within one or more of applications 101–103. Alternatively, even if DSS module 104 is a separate program from applications 101–103, DSS module may be installed in the process of installing one or more of applications 101–103. For example, when a user installs application A 102, part of the installation may also cause installation of DSS module 104. Later, DSS module may run separately from application A 102. For example, DSS module 104 may run in the background when application A 102 is not running, and even before application A ever runs. By running separately from the applications, DSS module 104 is able to obtain updated splash screens for the various applications when the applications are not running. DSS module may place itself into a dormant state, for example, for 24 hours after obtaining updated splash screens. The DSS module 104 may also be installed separately from installation of applications programs.

The system provides new splash screens to applications, and the applications select the correct splash screens to be displayed with the applications. Some of these applications have particular dynamic splash screens associated with them. For example, application A 102 is associated with dynamic splash screen A 105, and application B 103 is associated with dynamic splash screen B1 106 and dynamic splash screen B2 107. When an application is launched, the appropriate splash screen associated with that application is displayed on monitor 110. For example, if application A 102 is launched, then dynamic splash screen A 105 is displayed on monitor 110 (as dynamic splash screen 111). If multiple splash screens corresponding to an application are present on client PC 100, then the application selects among the multiple splash screens and displays one of them. For example, dynamic splash screen B1 106 and dynamic splash screen B2 107 correspond to application B 103. Dynamic splash screen module 104 within application B 103 selects from among dynamic splash screen B1 106 and dynamic splash screen B2 107. The application may select among the screens based on factors such as which screen has not been displayed for the longest time period. For example, dynamic splash screen module 104 may choose dynamic splash screen B1 if last time application B 103 was launched at that time dynamic splash screen B2 107 was displayed. Thus, application B 103 this time would be displaying a screen, dynamic splash screen B1 106, which was not shown the previous time.

Dynamic splash screens 105, 106, and 107 are stored on a local storage device at client PC 100, such as a hard drive. Dynamic splash screens are stored in the Windows registry, on systems having Windows 95 operating system.

The dynamic splash screens on client PC 100 are obtained via Internet 130 from server 140. Dynamic splash screen module 104 identifies applications installed to server 140. As shown, client PC 100 sends to server 140 via Internet 130 an application ID 120 of an application installed on client PC 100. Application ID, may identify, for example application A 102, which is installed on client PC 100. Client PC 100 also sends splash screen ID's 121 which identify splash screens that are already present on client PC 100. Server 140 responds with splash screens 123 and digital signature 122. Splash screens 123 are then stored on client PC for future use when application start up. Digital signature 122 may be used to verify that the splash screens originated from an authorized server.

Dynamic splash screen module 104 does not create an Internet connection in order to obtain new splash screens 123 from server 140 over the Internet 130. Rather, dynamic splash screen module 104 detects whether client PC 100 already has an active Internet connection. If client PC 100 already has an Internet connection, then dynamic splash screen module 104 uses that connection. For example, dynamic splash screen module may communicate over an Internet connection established by Internet application 101, which could be a web browser communicating over Internet 130.

Dynamic splash screen module 104 is a computer program or portion of a computer program. Dynamic splash screen module 104 may be stored in a computer readable medium such as a computer diskette. Dynamic splash screen module 104 includes computer code, which can be transferred from a computer diskette to a local storage device at client PC 100, such as a hard drive. As shown, dynamic splash screen module 104 is separate from application A 102 and application B 103, which use splash screens 105, 106, and 107, which were stored by dynamic splash screen module 104. Alternatively, dynamic splash screen module 104 may be a part of one or more applications 102 and 103 that use the splash screens 105, 106, and 107.

When application B 103 is launched, application B 103, which may also be stored on a hard drive, is at least partially loaded into computer volatile memory.

Server 140 stores splash screens that are available to be transmitted to various computers, such as client PC 100. Server 140 maintains application list 141 of applications for which new splash screens may be requested. Server 140 also maintains splash screens 142 which may be sent over Internet 130 to client PC 100. Server 140 is also coupled through Internet 130 to other PCs. For example, server 140 may support multiple client PCs that run various combinations of applications for which server 140 has splash screens and applications for which server 140 does not have splash screens. Administrative terminal 143 allows an operator to monitor server 140 and update splash screens 142 and application list 141 by adding new screens or new applications and new combinations of applications and associated screens.

Figure 2:
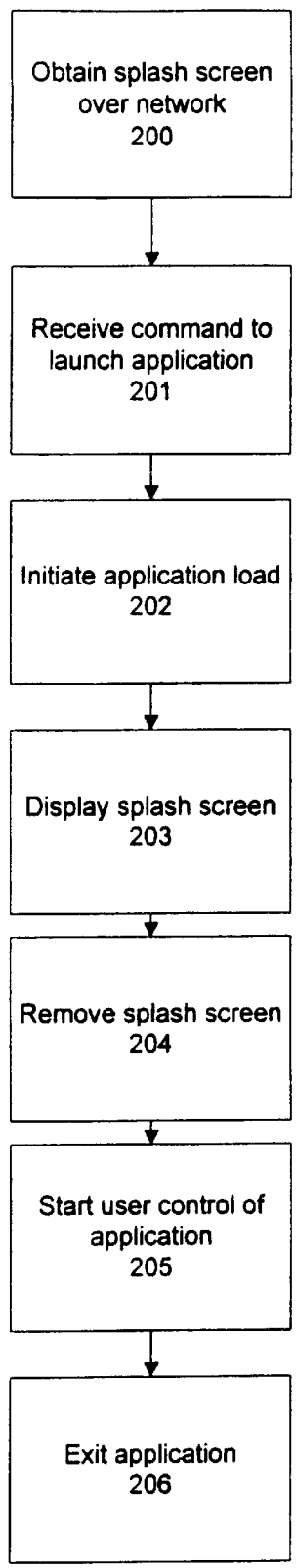
FIG. 2 is a flow chart illustrating a method of obtaining and displaying a splash screen.

FIG. 2 is a flow chart illustrating a method of obtaining and displaying a splash screen. First, a splash screen is obtained over the network (Block 200). According to one embodiment of the invention, the splash screen is obtained over the Internet 130 by dynamic splash screen module 104. A command is received to launch the application (Block 201). The command received to launch the application may be, for example, the result of a click on an icon for the application program. Application load is initiated (Block 202). Application load involves preparing an application program for running, for example, by loading some of the application's code into memory from a storage device. The splash screen is displayed (Block 203). Then, the splash screen is removed (Block 204). This may be after a delay of 15 seconds, for example. Next, user control of the application is initiated (Block 205). The user can, for example, start to enter information or can control the application in some way. The user may also be able to interact with the application in some way before the splash screen is removed when the splash screen itself allows for user input. Finally, the application is exited, typically after the user has had some interaction with the application, using the application in the manner for which the user intended to use the application (Block 206).

The above sequence may be used in an application such as a computer game, a spreadsheet, a word processing program, or other application program. Consider the example of a word processing program. The splash screen for the word processing program is obtained over the network (Block 200). For example, a splash screen advertising an upgrade for the word processor is obtained. Alternatively, a splash screen advertising a spreadsheet is obtained. The user clicks an icon to initiate the application, e.g., an icon for Microsoft Word. Then a command is received to initiate application load. (Block 201). The word processing application begins to load (Block 202), then the splash screen is displayed (Block 203). The splash screen may introduce the application with its name, e.g. Microsoft Word. The splash screen is removed (Block 204). The removal may take place before all of the program code for the word processing application has been loaded into memory from the storage device. Further loading of parts of the application program may take place as the user operates the program. Then user control of the application program is initiated (Block 205). In this example, the user may now be able to open a word processing file or start to enter text. Finally the application program exits (Block 206). The user may cause the program to exit, or the program may automatically exit under particular conditions.

Figure 3:
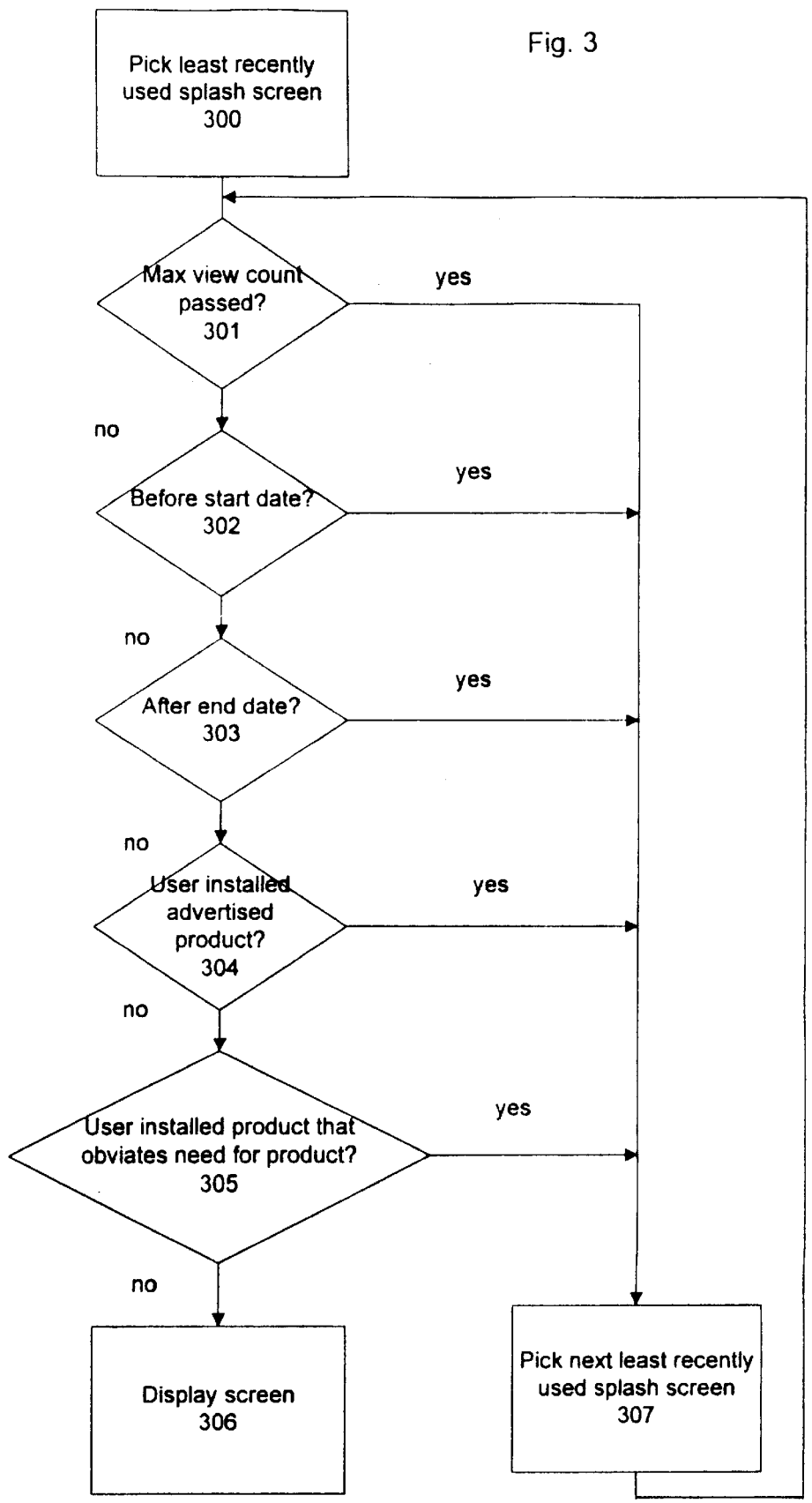
FIG. 3 is a flow chart illustrating a method of selecting a splash screen on a local system.

FIG. 3 is a flow chart illustrating a method of selecting a splash screen on a local system. The least recently used splash screen associated with this application is picked (Block 300). Picking the least recently used screen provides variety in the splash screens seen by the user. A series of criteria are checked before displaying the picked splash screen. These criteria are checked by checking the appropriate fields of a data structure in which the splash screen is stored. If any of the following have occurred, then the next least recently used splash screen is not displayed (Block 307): Maximum view count has passed (Block 303), it is before the start date (Block 302), it is after the end date (Block 303), the user has installed the advertised product (Block 304), or the user has installed a product that obviates the need for the advertised product (Block 305). The view count (Block 303) represents a number of times that the splash screen is to be displayed. For example, a splash screen may have a view count of five or ten or other number of times for which it may be viewed. The start date is a date before which the splash screen should not be shown. For example, a splash screen may have a start date some number of months in the future so that although the splash screen is downloaded today it would not be shown until the application is run a few months in the future. The end date (Block 303) is a date after which the splash screen should not be shown again. For example, if the splash screen is associated with a special offer that expires at some time in the future, then the after end date could be set to that date in the future. Then the splash screen displaying the offer would no longer appear after the date when the offer is no longer valid. It would also be possible to include in a splash screen data structure a start time and end time or multiple start and stop times or dates. These would then also be used as criteria in determining whether to display the splash screen corresponding to the data structure. A splash screen may be used to advertise a product. Thus, if the user has already installed the advertised product associated with a screen, the screen is not displayed (Block 304). Similarly, if the user has installed a product that obviates the need for the product advertised by the splash screen, the splash screen is not displayed (Block 305). When these conditions are true, then the next least recently used splash screen is displayed (Block 307). Alternatively, a default splash screen may be chosen if no other splash screen is available. If the above criteria are met, then the splash screen is displayed (Block 306).

The tests above help to allow a set of splash screens to be transmitted from the server to client PC 100, even though those splash screens would not necessarily be applicable for every time that the associated application loads. However, the set of splash screens can be downloaded to server 110 and stored because of the selection process which determines whether a splash screen should be displayed. Before checking the criteria listed above, the application first determines whether the splash screen is associated with the application by determining whether the application's ID is stored in the data structure associated with the splash screen.

Figure 4:
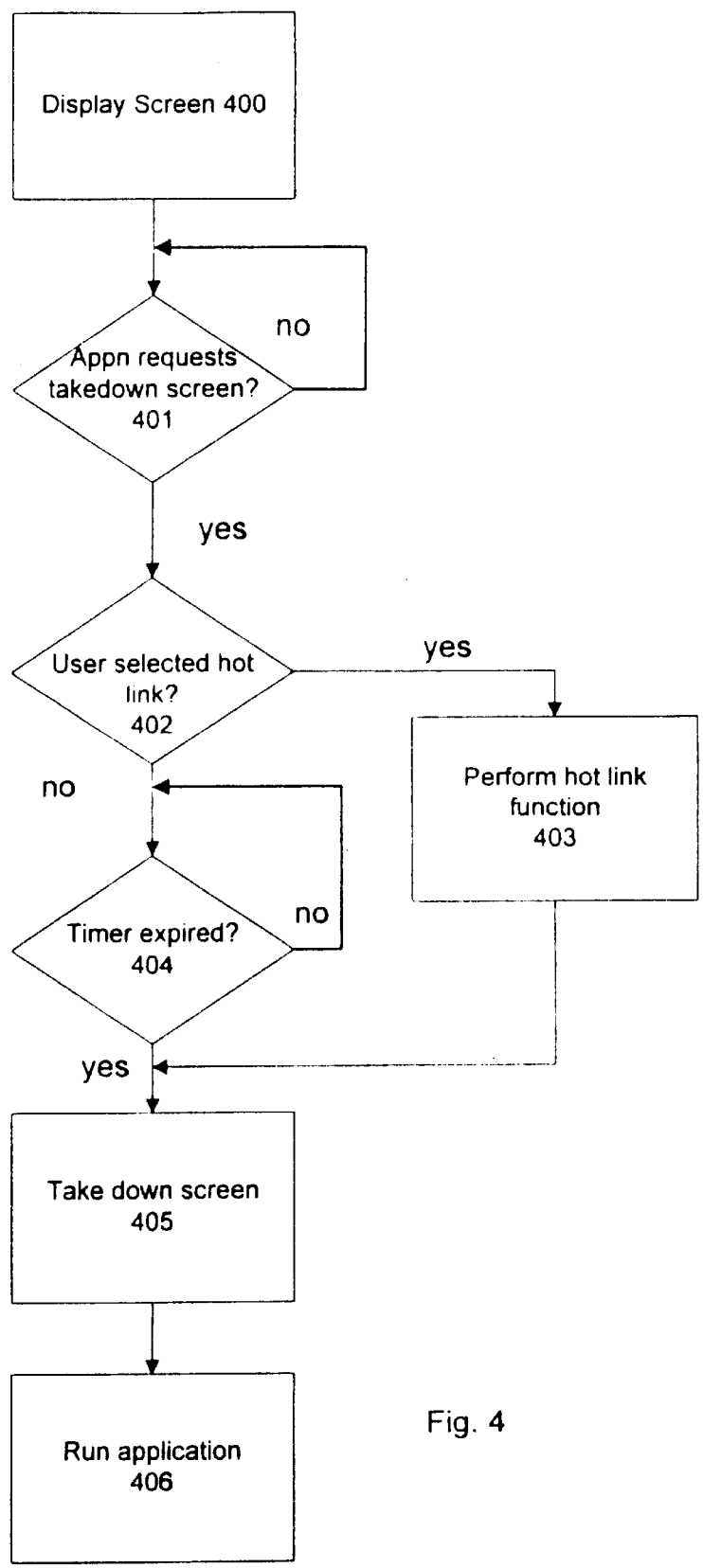
FIG. 4 is a flow chart illustrating a method of displaying and taking down a splash screen.

FIG. 4 is a flow chart illustrating a method of displaying and taking down a splash screen. The splash screen is displayed (Block 400). If the application has requested to take down the screen (Block 401), then proceed to Block 402. If the application has not requested to take down the screen (Block 401), then continue to wait for the application to request to take down the screen. In Block 402, if the user has selected a hot link, then perform the hot link function (Block 403). The hot link function could be a number of functions, such as a request to obtain information over the Internet. If this is the case, even though the application may otherwise not have an Internet connection, it would create an Internet connection in response to the selection of the hot link requesting the Internet connection. Also in response to the selection of the hot link, the application may show additional information. If the user has not selected the hot link, determine whether a timer has expired (Block 404). If the timer has not expired, wait for the timer to expire. The timer determines the length of time that the splash screen is displayed before it is removed. The duration for which the timer is set may be stored in the data structure corresponding to the screen. The time is set to a reasonable time that a user would expect to see a splash screen displayed. For example, not more than 15 seconds. The splash screen may in other embodiments less than 30 seconds, 45 seconds, one minute, or two minutes. After the timer has expired, take the screen down (Block 405). Next, run the application (Block 406). Note that the application may have already started running as the splash screen is shown.

Figure 5:
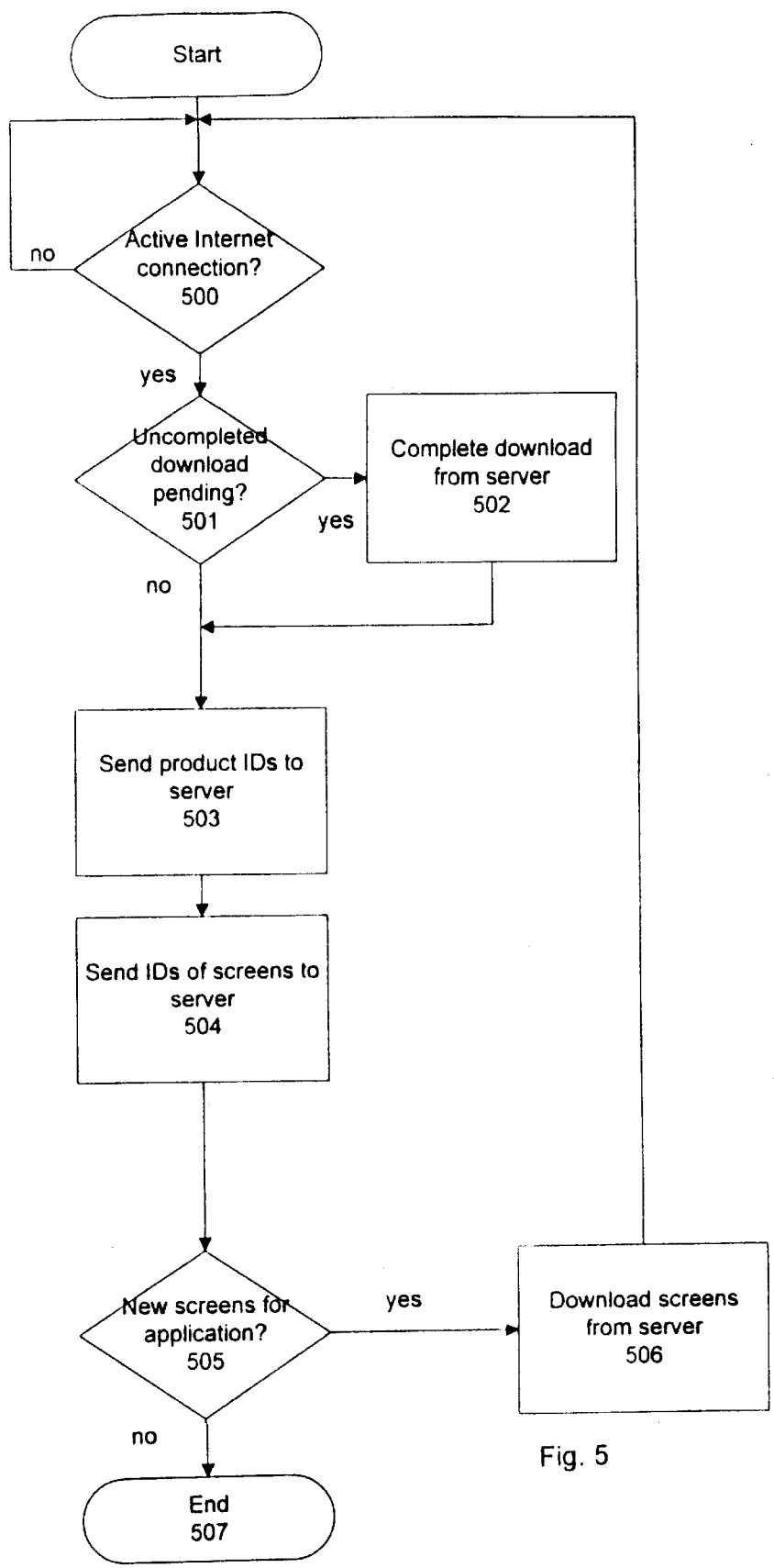
FIG. 5 is a flow chart illustrating a method of loading splash screens.

FIG. 5 is a flow chart illustrating a method of loading splash screens. First, it is determined whether there is an active Internet connection (Block 500). If there is no active Internet connection, wait for an active Internet connection at Block 500. This helps to minimize disturbance to a user that may be caused by initiating an otherwise unwanted dial-up or other connection to the Internet. If there is an active Internet connection, then contact the Web server which contains the splash screens (Block 501). If an uncompleted download is pending (Block 501), complete the download from the server (Block 502). Send the product IDs of applications installed on client PC 100 to the server (Block 503). Alternatively, dynamic splash screen module 104 may determine whether an application has run within a period, such as 30 days, 60 days, or 90 days and then only send the product ID if the application has run in that period. According to another embodiment of the invention, dynamic splash screen module 104 sends, in addition to a product IDs, information about when and how the applications were used or were last used. This allows the server to select splash screens that correspond to applications on client PC 100. Next, send ID's of screens already on client PC 100 so that server 140 does not send screens already downloaded to client PC 100 (Block 504). Determine whether new screens corresponding to the application are present on server 140 (Block 505). If no new screens are present, then end (Block 507). Otherwise, download the screens (Block 506). Note that if the Internet connection ends before a download is completed, the download is completed at another time, leaving off where it was terminated previously. Also, the screens are downloaded in small pieces so as to provide little interference with the users use of the Internet connection for other purposes. After completing downloading of screens, wait 24 hours before contacting server 140 again to obtain more screens. This wait period may be adjusted according to needs of the communication channel and the applications and may alternatively comprise a period less than 24 hours, less than an hour, greater than an hour, greater than 24 hours, greater than 48 hours, greater than a week.

The dynamic splash screen has at least several key advantages. Because the system provides splash screens associated with application programs, the splash screens can be used to target messages relevant to the particular application program. For example, a targeted communication may be sent to users including users who did not register their product. The dynamic splash screen also provides communication to users who may have an illegal copy of the product and provides the opportunity to offer such customers an upgrade to be purchased. The splash screen is also flexible and may be used on a certain subset of client PC's which are running the particular applications.

A splash screen provides a particular advantage for providing messages to a user since the user is not engaged in using the functionality of the product when a splash screen is typically displayed. Additionally, a user typically expects the splash screen to be visible for several seconds at least while the product is loading in the background. Since the user has just double-clicked the application (or document), the user's attention is likely on the screen. According to an embodiment of the invention, a new splash screen uses only a small amount of the user's hard drive.

The splash screen may be applied in client PC 100 in a Windows 95 operating system Windows NT, Windows 3.1, Mac OS, or other operating system environment. The splash screen system may be used with various applications of various type. For example, server 140 may include an application list having applications such as various types of computer game applications, financial applications, or other applications. An application may be non-Internet based other than the fact that it uses the Internet to obtain the splash screens. Alternatively, the application may use the Internet extensively. A particular client PC 100 may have some applications which use dynamic splash screens. Some of the applications may share some splash screens, and in other cases an application may not share splash screens with other applications.

Other information that may be transmitted via splash screens and displayed to the user in splash screens, includes demos of new products, winning designs in contest, high scores and winning players in a computer game, hints regarding how to use a product, and additional ready mades.

The data structures in which the splash screens are stored are created such that they can be used or at least read by all applications that are intended to work with the splash screens. This allows an application to determine whether a splash screen corresponds to the application.

According to an embodiment described above, dynamic splash screen module 104 downloads splash screens for any application installed on client PC 100. Alternatively, applications contain their own dynamic splash screen modules that initiate downloading of splash screens. According to one alternative implementation of the invention, an application only downloads splash screens for itself and not for other applications that would use splash screens. This helps to prevent bandwidth usage for splash screens that would never be viewed because the user has stopped using the application that would display the splash screen. The applications indicate to the server which application they are and which splash screens have already been downloaded. The logic as to whether to use a splash screen depending on other applications already installed on the user's computer is performed at client PC 100.

The first communication from the splash screen module 104 is a POST HTTP request to a predefined URL. The URL could be changed with regedit but also may be maintained as a constant. The user agent field will be set to, for example, "user-agent: <SOFTWARE COMPANY> application DSS" to prevent standard browsers from accidentally accessing the URL The POST request contains the following parameters:

DSS Version (this allows the server 140 to know which version of Dynamic Splash Screen Module 104 the application uses.)

MyAppIDs (each application has a unique ID assigned during development.)

SSIDs ID of previously received splash screens (comma separated list where the commas are converted to %2C in keeping with standard HTTP and browser behavior.) Each splash screen has a unique ID assigned during the creation of the splash screen.

Thus, client PC 100 sends via Internet 130 to server 140 information regarding the application that is requesting the splash screen, the splash screens already on client PC 100, and the version of dynamic splash screen module 104 running on client PC 100. If the user agent does not match, the web server replies with the standard (404 file not found.) Thus, from a standard browser's point of view, there is no such URL. If there is an error in the application's POST REQUEST, the server returns a well formed XML error page that has tags for an error number <ERRORNUM><ERRORNUM> and for a default error string <ERRORSTR ></ERRORSTR>. Possible errors include incorrect DSS Version, and unknown application ID. If there are no additional splash screens for the applications, the server returns a well formed XML web page with the tags <CONTINUE></CONTINUE> in it.

When there is a new splash screen, it is returned embedded in a well-formed XML web page. The format specifying hot spots and the associated URLs on the splash screen graphic is the HTML standard for a client side image maps so that the testing of the page in a browser can set the hot spots correctly for use in applications. However, the module does not download the files indicated in the <IMG> tag. Instead it downloads the file specified in the <GRAPHICS> tag and concatenates them to construct the splash screen. The module inserts delays between the downloads of pieces that constitute the splash screen graphic in order to give adequate bandwidth to other Internet applications using the connection. A single splash screen, according to an embodiment of the invention, contains exactly one graphic.

According to this particular format, only one splash screen is returned by server 140 at a time. This format of the returned page does not allow multiple splash screens to be specified in a single page. If there is more than one splash screen to be sent to client PC 100, the one with the earliest expiration date is sent first. The next one would be sent the next time the module issues its POST to the server.

In order to prevent use of bandwidth to retrieve splash screens to applications that are not being used by the users of this computer, dynamic splash screen module 104 makes no requests for applications that have not been run in 90 days.

All communications from the server are digitally signed using the PGP's implementation of the Digital Signature Algorithm (DSA). Each returned HTML page will have a <SIG></SIG> tag pair. The information within that tag is an 88 byte Base64 converted version of the 66 byte DSA signature. The DSA signature is calculated across the entire HTML file with nothing between the <SIG> and </SIG> tags. Each separately downloaded piece of the splash screen graphic will include a 66 byte binary DSA signature calculated over that piece. That signature is prepended to the graphic data.

Contents of the downloaded splash screen data structure are as follows:

The first text in the <BODY> section of the HTML page is the version number of the protocol being used. For the initial version, this line could be "DSS V1.0," for example.

Graphic pieces to be downloaded to assemble the complete splash screen graphic. Pseudo HTML tag <GRAPHICS>. Rather than specifying all of the graphics pieces, only the final piece is specified. Because of a strict naming convention, the other graphics pieces URLs are implicit in the specification of the final piece.

Start date Pseudo HTML tag <START>. Format is YYYYMMDD.

Stop date Pseudo HTML tag <STOP>. Format is YYYYM-MDD.

Maximum number of times to display per application Pseudo HTML tag <MAXVIEWS>.
Application ID of advertised product Pseudo HTML tag <APPID>.
Splash Screen ID of this particular Splash Screen Pseudo HTML tag <SSID>.
Application IDs of other products that obviate the need for this product. Pseudo HTML tag <SKIPID>. Format is comma separated list.
Application IDs of products that should display splash screen Pseudo HTML tag <SHOWID>. Format is comma separated list.
How long the splash screen should be displayed (in milliseconds) Pseudo HTML tag <DURATION>.
URLs to go to on click through. Done in a HTML standard <MAP> structure. Screen coordinates within Graphic that correspond to each URL. Done in the HTML standard <MAP> structure.
The page, optionally, may contain additional content to human readability of the page. It will always be the case that only the information contained in the tags listed above will be used by the application.
The page contains its digital signature within the Pseudo HTML tag <SIG> as described above.
For simplicity of parsing, nothing may appear between the open and close pseudo tags other than the required content, whitespace, and the <BR></BR> tag. Because the DSA signature must remain unmodified, nothing may appear between the <SIG> and </SIG> tags except the 88 bytes. Upon receiving the HTML page and verifying the signature, DSS module 104 checks the parameters in the <SKIPID> and <APPID> tags for the splash screen. If any of those The module 104 continues to communicate with the server until receiving a continue page, an error page, or a communication whose DSA signature fails to verify. When any of those events happens, cease contacting server 140 for 24 hours.

Following the completion of the communication with the server, the module 104 checks the status of all splash screens that have been downloaded. In the course of doing so, it may discover that one or more previously downloaded splash screens is no longer needed for one of four reasons:
The end date has passed.
The maximum view count has been reached for each installed application which uses this splash screen.
The user has installed the advertised product.
The user has installed a similar product that obviates the need for the advertised product.
If any of these criteria are met, delete the splash screen from the user's disk. This prevents occupying excessive amounts of the user's disk.

Until the end date has been reached, the module will retain the SSID of the deleted application so that it may be sent up to the server in the POST request. This prevents server 140 from attempting to download a splash screen for a second time after it has been fully used at client PC 100.

Splash screens may be formatted according to various formats, such as HTML, or as bit maps, or as video streams. Various arrangements of the data structures storing the splash screens are also possible. The following is an example splash screen according to an embodiment of the invention:

```
<?XML VERSION="1.0" RMD="NONE">
<HTML>
<HEAD>
</HEAD>
<BODY>
<BR></BR>
DSS V1.0
<BR></BR><BR></BR>
SSID: <SSID> 884288651 </SSID> <BR></BR>
Start Date: <START> 19970101 </START> <BR></BR> Stop Date: <STOP> 19980320 </STOP>
<BR></BR>
Max Views: <MAXVIEWS> 2000000000 </MAXVIEWS> <BR></BR> AppID: <APPID>
</APPID> <BR></BR>
AppIDSkip: <SKIPID> </SKIPID> <BR></BR> AppIDShow: <SHOWID> tom13 </SHOWID>
<BR></BR> Duration: <DURATION> 5000 </DURATION> <BR></BR> Graphic pieces:
<GRAPHICS>
http://beach.broder.com/DSS/SSs/884288651/884288651.jpg.003 </GRAPHICS> <BR></BR>
Graphic: <IMG SRC=http://beach.broder.com/DSS/SSs/884288651/884288651.jpg
usemap="#map"></IMG> <BR></BR>
<MAP name="map"> </MAP>
<SIG>iQA/AwUBNLUuCiElolv46rs/EQKQLQCffN/XsUAm1aS8r9da0UizJpKvDo0AoKtWFs/8/aKd/
n1 OGu9rd42RtcRq</SIG>
</BODY>
</HTML>
``` applications are already installed, the module does not download the graphic pieces. It simply notes the <SSID> and the <STOP> for use in determining what to send to the server in future POST requests.

If an installed splash screen on the client PC 100 needs to be removed, e.g., because it contains an error, the server returns a well-formed XML page that includes pseudo HTML tags bounding the SSID to be removed like "<REMOVE>nnnn </REMOVE>" where nnnn is the SSID to remove. Remove the SSID from the installed list. Normally one would not have a <REMOVE> section in a page specifying a new splash screen.

It is appreciated that various embodiments of the invention are possible without departing from the spirit of the invention. For example, in one embodiment, the information to be displayed to the user is transmitted over the Internet, while in another embodiment, the information is transmitted over a network which is not necessarily the Internet. In one embodiment, the information to be displayed to the user is displayed in a splash screen, while in another embodiment the information is not displayed in a splash screen but is displayed to the user in another manner. The information may include an image, text, or other information. The information may include information about products or other information.

Accordingly, the present invention provides improved methods of displaying information to a user. One embodiment involves obtaining the information over a network and displaying the information to the user. Another embodiment involves providing the information from a first computer to an application program to be displayed to a user upon startup of an application program where a first computer receives an identification of an application program installed on a second computer.

What is claimed is:

1. A method of displaying information to a user upon startup of a program that runs on a first computer, the method comprising:
   receiving the information at the first computer, the information having been sent over a network to the first computer;
   receiving additional information at the first computer from the second computer;
   receiving a command to launch the program on the first computer;
   receiving a second command to launch the program;
   after receiving the command to launch the program and without user intervention, displaying at least a portion of the information; and
   after receiving the second command to launch the program, displaying at least a portion of the additional information without user intervention;
   without user intervention, removing the at least a portion of the information.

2. The method of claim 1, wherein the information comprises a name of a newer version of the program.

3. The method of claim 1, wherein the displaying at least a portion of the information occurs during loading of the program from a storage device into computer memory.

4. The method of claim 1, wherein the displaying at least a portion of the information occurs during an interval of time endling less than fifteen seconds of beginning of loading of the computer program from a storage device into computer memory.

5. The method of claim 1, wherein the displaying at least a portion of the information occurs during an interval of time ending less than one minute of beginning of loading of the computer program from a storage device into computer memory.

6. The method of claim 1, the program storing at least a portion of the information on a storage device in at least a first data structure, the first data structure corresponding to a screen.

7. The method of claim 6, including storing the first data structure in a resource shared by programs.

8. The method of claim 7, wherein the resource comprises a Windows registry.

9. The method of claim 6, wherein the data structure includes a number corresponding to a start date and the method includes displaying the screen corresponding to the data structure only after the start date.

10. The method of claim 6, wherein the data structure includes a number corresponding to a stop date and the method includes displaying the screen corresponding to the data structure only before the stop date.

11. The method of claim 6, wherein the data structure includes a number corresponding to a duration and the method includes displaying the screen corresponding to the data structure only for a period of the duration.

12. The method of claim 6, wherein the data structure includes a digital signature and the method includes displaying the screen based upon the digital signature.

13. The method of claim 6, wherein the data structure includes an identification of a second program and wherein the method includes displaying the screen if the second program is not installed on the storage device.

14. The method of claim 13, wherein a name of the second program appears in the screen corresponding to the data structure.

15. The method of claim 6, wherein the storage device includes a second data structure corresponding to a second screen and wherein the method includes:
   after receiving a second command to launch the program, selecting among the first data structure and the second data structure based on when the program displayed a screen corresponding to the first data structure relative to when the program displayed a screen corresponding to the second data structure.

16. The method of claim 6, wherein the storage device includes a second data structure corresponding to a second screen and wherein the method includes:
   after receiving a second command to launch the program, selecting among the first data structure and the second data structure based on which data structure corresponds to the program.

17. The method of claim 1, comprising:
   sending over the network to the second computer an identifier of a data structure stored on a local storage device, the data structure corresponding to a screen; and
   the second computer sending additional information over the computer network based on the identifier of the data structure.

18. The method of claim 1, comprising:
   sending over the network to the second computer an identifier of a data structure stored on a local storage device, the data structure corresponding to a screen; and
   the second computer sending additional information over the computer network only if the additional information does not correspond to the data structure.

19. A method of displaying information to a user upon startup of a program that runs on a first computer, the method comprising:
   sending over a network from the first computer to a second computer an identifier of the program;
   receiving at the first computer the information from the second computer, the information having been sent based on the indentifier of the program;
   receiving a command to launch the program;
   after receiving the command to launch the program, displaying at least a portion of the information.

20. The method of claim 19, comprising:
   receiving a command to launch a second program; and
   after receiving the command to launch the second program, displaying the at least a portion of the information.

21. The method of claim 19, comprising:
   sending over the network from the first computer to the second computer an identifier of a second program that runs on the first computer; and
   based on the identifier of the second program, the second computer sending additional information over the network to the first computer.

22. The method of claim 21, comprising:
after receiving a command to launch the second program, displaying at least a portion of the additional information.

23. The method of claim 19, the displaying comprising displaying a name of a newer version of the program.

24. The method of claim 19, comprising:
receiving additional information at the first computer from the second computer;
receiving a second command to launch the program;
after receiving the second command to launch the program, displaying at least a portion of the additional information.

25. The method of claim 19, wherein the displaying at least a portion of the information occurs during loading of the computer program from a storage device into computer memory.

26. The method of claim 19, including removing the least a portion of the information without user intervention.

27. The method of claim 19, wherein the displaying at least a portion of the information occurs during a period that lasts until about fifteen seconds of beginning of loading of the computer program from a storage device into computer memory.

28. The method of claim 19, wherein the displaying at least a portion of the information occurs during a period that lasts about until one minute of beginning of loading of the computer program from a storage device into computer memory.

29. The method of claim 19, wherein sending over the network to the second computer an identifier of the program occurs only while a network session established by another program remains active.

30. The method of claim 19, the program storing at least a portion of the information on a storage device in at least a first data structure, the first data structure corresponding to a screen.

31. The method of claim 30, including storing the first data structure in a resource shared by programs.

32. The method of claim 31, wherein the resource comprises the Windows registry.

33. The method of claim 30, wherein the data structure includes a number corresponding to a start date and the method includes displaying the screen corresponding to the data structure only after the start date.

34. The method of claim 30, wherein the data structure includes a number corresponding to a stop date and the method includes displaying the screen corresponding to the data structure only before the stop date.

35. The method of claim 30, wherein the data structure includes a number corresponding to a duration and the method includes displaying the screen corresponding to the data structure only for a period of the duration.

36. The method of claim 30, wherein the data structure includes a digital signature and the method includes displaying the screen based upon the digital signature.

37. The method of claim 30, wherein the data structure includes an identification of a second program and wherein the method includes displaying the screen if the second program is not installed on the storage device.

38. The method of claim 37, wherein a name of the second program appears in the screen corresponding to the data structure.

39. The method of claim 30, wherein the storage device includes a second data structure corresponding to a second screen and wherein the method includes:
after receiving a second command to launch the program, selecting among the first data structure and the second data structure based on when the program displayed a screen corresponding to the first data structure relative to when the program displayed a screen corresponding to the second data structure.

40. The method of claim 30, wherein the storage device includes a second data structure corresponding to a second screen and wherein the method includes:
after receiving a second command to launch the program, selecting among the first data structure and the second data structure based on which data structure corresponds to the program.

41. The method of claim 19, comprising:
sending over the network to the second computer an identifier of a data structure stored on a local storage device, the data structure corresponding to a screen; and
the second computer sending additional information over the computer network based on the identifier of the data structure.

42. The method of claim 19, comprising:
sending over the network to the second computer an identifier of a data structure stored on a local storage device, the data structure corresponding to a screen; and
the second computer sending additional information over the computer network only if the additional information does not correspond to the data structure.

43. A method of providing information from a first computer to a second computer, the information to be displayed to a user upon startup of a program on a second computer, the method comprising:
at the first computer, receiving over a network from the second computer an identification of a program installed on the second computer;
at the first computer, selecting a data structure corresponding to the program based on the identification of the program, the data structure including information to be displayed by the program on the second computer; and
sending the data structure over the network to the second computer.

44. The method of claim 43, wherein the data structure includes an identification of a newer version of the program.

45. The method of claim 43, wherein the data structure comprises a graphical image.

46. The method of claim 43, wherein the data structure comprises a graphical image that includes an identification of a newer version of the program.

47. The method of claim 43, comprising:
at the first computer, receiving over the network from the second computer an identification of a second program installed on the second computer;
at the first computer, selecting a second data structure corresponding to the second program; and
sending the second data structure over the network to the second computer.

48. The method of claim 47, wherein the first data structure comprises the second data structure.

49. The method of claim 47, wherein the first data structure does not comprise the second data structure.

50. The method of claim 43, comprising:
at the first computer, receiving over the network from a third computer an identification of the program;
at the first computer, selecting the data structure based on the identification of the program; and sending the data structure over the network to the third computer.

51. The method of claim 43, wherein the data structure includes a number corresponding to a start date after which to display a screen corresponding to the data structure.

52. The method of claim 43, wherein the data structure includes a number corresponding to a start time after which to display a screen corresponding to the data structure.

53. The method of claim 43, wherein the data structure includes a number corresponding to a stop date before which to display a screen corresponding to the data structure.

54. The method of claim 43, wherein the data structure includes a number corresponding to a stop time before which to display a screen corresponding to the data structure.

55. The method of claim 43, wherein the data structure includes a number corresponding to a duration for which to display a screen corresponding to the data structure.

56. The method of claim 43, wherein the data structure includes a digital signature.

57. The method of claim 43, wherein the data structure includes an identification of a second program that obviates the need for the screen corresponding to the data structure.

58. The method of claim 57, wherein the name of the second program appears in a screen corresponding to the data structure.

59. The method of claim 43, comprising:
at the first computer, receiving over the network from the second computer an identification of a second data structure present on the second computer;
at the first computer, selecting a third data structure that does not comprise the second data structure, the third data structure including information to be displayed by a program on the second computer; and
sending the third data structure over the network to the second computer.

60. In a computer program, a method of displaying information to a user, the method comprising:
obtaining using a communications module over the Internet information to be displayed to the user; and
displaying at least a portion of the information in a splash screen;
wherein the communications module runs at least at some time when a program in which the information is to be displayed is not running.

61. The method of claim 60, wherein the displaying at least a portion of the information ends within a period from beginning of loading a program into computer memory.

62. The method of claim 60, wherein the displaying at least a portion of the information occurs at least until an API request to remove the splash screen is generated.

63. The method of claim 60, wherein the displaying at least a portion of the information occurs at least until the later of:
an API request to remove the splash screen is generated and
a period from beginning of loading a program into computer memory.

64. The method of claim 60, wherein the displaying at least a portion of the information occurs at least until the earlier of:

receipt of a take down message and
a period from beginning of loading of a program into computer memory.

65. The method of claim 60, wherein the obtaining over the Internet information to be displayed to the user occurs over an Internet connection initiated for other than obtaining the information.

66. The method of claim 60, wherein the information comprises at least one graphical image.

67. The method of claim 60, wherein the information comprises text.

68. The method of claim 60, wherein the information comprises text and at least one graphical image.

69. The method of claim 60, wherein the information comprises data formatted according to hypertext markup language (HTML).

70. The method of claim 60, further comprising:
displaying at least a second portion of the information in a second splash screen.

71. The method of claim 70, wherein the displaying at least a second portion of the information in a second splash screen occurs within a period from beginning of loading of a program into computer memory.

72. The method of claim 71, wherein the displaying at least a second portion of the information in a second splash screen occurs within 20 seconds of a second beginning of loading of the program into computer memory.

73. The method of claim 60, further comprising:
displaying respective portions of the information in respective splash screens within periods of respective beginnings of loading of a program into computer memory.

74. The method of claim 60, wherein the program comprises a computer game.

75. A method of displaying information to a user in a local computer program, the method comprising:
obtaining the information over the Internet;
after obtaining the information, receiving a command to launch the program;
after receiving the command, loading from a local storage device a portion of the information to be displayed to the user;
displaying the portion of the information in a splash screen;
after displaying the portion of the information in a splash screen, loading from the storage device into computer memory at least a portion of the computer program; and
after loading from the storage device into computer memory the portion of the computer program, removing the splash screen.

76. The method of claim 75, comprising:
after loading from the storage device the portion of the computer program, obtaining additional information over the Internet; and
after receiving a second command to launch the program, displaying at least a portion of the additional information in a second splash screen.

* * * * *